United States Patent [19]

Foultner et al.

[11] Patent Number: 4,846,382
[45] Date of Patent: Jul. 11, 1989

[54] DASH MOUNTING DEVICE

[75] Inventors: Jerry L. Foultner, Rainier; Wesley F. Foultner, Clatskanie, both of Oreg.

[73] Assignee: Nancy E. Foultner, Clatskanie, Oreg.

[21] Appl. No.: 143,564

[22] Filed: Jan. 13, 1988

[51] Int. Cl.[4] ............................................. B60R 7/06
[52] U.S. Cl. ................................. 224/42.42; 224/277; 224/42.23; 224/901; 108/44; 108/45; 180/90; 296/37.12
[58] Field of Search ................. 224/42.42, 901, 273, 224/274, 275, 277, 278, 42.01, 42.43, 42.44, 42.45 R; 296/37.1, 37.8, 37.12, 70, 74; 180/90; 108/44, 45; 455/90, 345; 369/69

[56] References Cited

U.S. PATENT DOCUMENTS

| 2,678,833 | 5/1954 | Loeb | 224/42.42 R |
|---|---|---|---|
| 2,931,550 | 4/1960 | Wood | 224/275 X |
| 2,971,572 | 2/1961 | Watkins | 224/275 X |
| 3,262,096 | 7/1966 | Nunn, Jr. | 455/90 X |
| 3,318,456 | 5/1967 | Lipe | 108/44 |
| 3,326,446 | 6/1967 | Goings | 108/44 |
| 3,632,158 | 1/1972 | Boothe | 224/275 X |
| 4,055,286 | 10/1977 | Schmid | 224/42.42 R |
| 4,105,246 | 8/1978 | Trumbull | |
| 4,508,381 | 4/1985 | Herring | |
| 4,568,404 | 2/1986 | Herring | |
| 4,577,788 | 3/1986 | Richardson | 224/273 |
| 4,619,386 | 10/1986 | Richardson | 224/277 |
| 4,684,164 | 8/1987 | Durham | 296/37.7 |

FOREIGN PATENT DOCUMENTS 2643579  3/1978  Fed. Rep. of Germany.

Primary Examiner—Henry J. Recla
Assistant Examiner—Robert M. Fetsuga
Attorney, Agent, or Firm—Klarquist, Sparkman

[57] ABSTRACT

A vehicle dash mounting device for mounting at least one accessory to a top surface of a vehicle dash includes a housing for mounting to the top surface of the vehicle dash with an upper housing surface and hook and eye fabric fasteners for detachably securing the accessory to the upper housing surface. The housing is also detachably mounted to the dash by hook and eye fabric fasteners. Additionally, for vehicles with a defroster-type vent in the dash, a hook is mounted to the upper housing surface to engage the vent. The housing is generally of a wedge shape, tapering with the downwardly sloping top surface of the dash to position the upper housing surface in a substantially horizontal plane. For accessories with bottom mounted speakers, such as some CB radios, the upper housing surface has an aperture beneath the radio, and the front face also has one or more apertures to allow sound from the speaker to be heard within the vehicle passenger compartment.

15 Claims, 2 Drawing Sheets

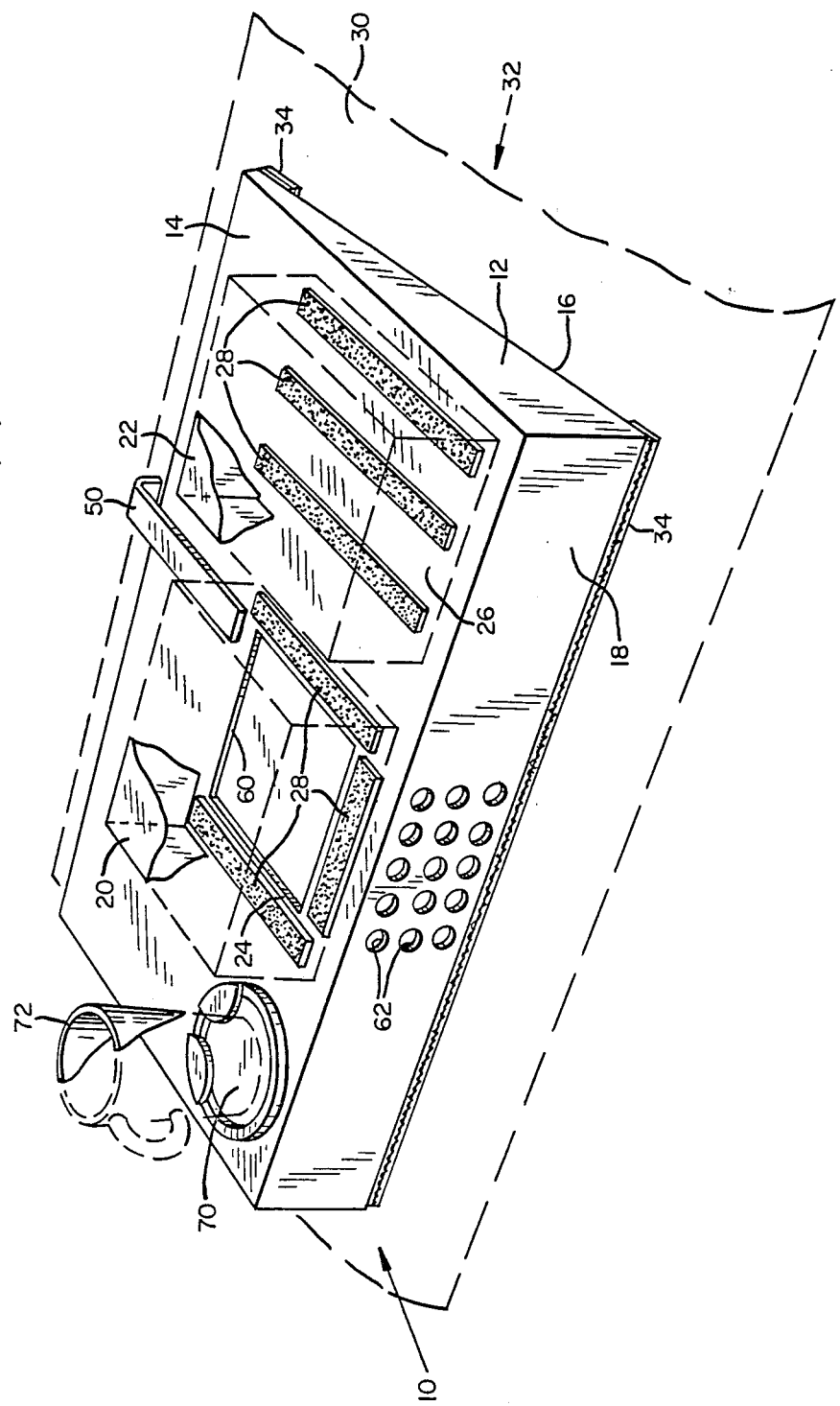

DASH MOUNTING DEVICE

BACKGROUND OF THE INVENTION

The present invention relates generally to the mounting of accessories to the dash within a vehicle passenger compartment, and more specifically to an improved mounting device.

Some prior devices require a considerable amount of alteration to the vehicle's interior before they can be used. For example, U.S. Pat. No. 4,684,164 to Durham provides an apparatus for housing and deploying a radar detector in a vehicle. When in use, the radar detector extends into the passenger compartment of the vehicle. When not in use, the detector retracts into a compartment positioned in either the vehicle ceiling or the dashboard. Installation of this device requires the cutting of large holes in either the ceiling or the dash of a vehicle. This is time consuming and presents a risk of damage to the vehicle during installation. Also, the device is not easily transferable from one vehicle to another.

Another such device which requires extensive alteration of a vehicle dash is shown in U.S. Pat. No. 4,105,246 to Trumbull. Trumbull's multipurpose dashboard attachment is mounted flush with the vehicle dash. To accomplish this mounting, extensive modification of the dashboard is required. The Trumbull device is intended to be left permanently in place.

A German patent, No. 26 43 579, to Behr shows another dash mounted device. In one form, this device may be mounted to the surface of the dashboard. Although the Behr patent has not been translated, this device apparently records or processes information, perhaps trip mileage.

Another prior art dash mounted device is a portable desk container shown in U.S. Pat. No. 4,577,788 to Richardson. The rectangular-shaped container of Richardson is detachably mounted by hook and eye fabric to the top surface of the vehicle dash. Additionally, support arms secured in place by hook and eye fabric fasteners connect the container to the front vertical part of the dash. A clipboard is likewise detachably mounted to the top of the container. The container is designed to be portable for use in the vehicle or elsewhere.

With the general rise of the crime rate today, more owners of vehicles are finding that their cars or trucks have been broken into while left parked and unattended. While the car itself may not be taken, various accessories, such as citizen's band (CB) radios, tape decks, and radar detection units are often stolen. Also, the vehicle itself may sustain extensive damage during the unauthorized removal of these accessories.

One way to deter the theft of such vehicle accessories is to remove them from a parked vehicle or from sight within the vehicle. Hence, there exists a need to make these accessories easily detachable by the owner for placement in a more secure location. They must also be easily reinstalled.

Therefore, although other dash mounting devices are known, a need exists for an improved apparatus for mounting various accessories on the dash of a vehicle.

SUMMARY OF THE INVENTION

It is an overall object of the present invention to provide an improved dash mounting device for various vehicle accessories.

A further object of the invention is to provide a dash mounting device from which various accessories can be easily attached and removed by the owner.

Another object of the present invention is to provide a dash mounting device which may be easily removed by the owner from a vehicle dash and reinstalled in the same or another vehicle, with or without one or more accessories still attached.

Still another object of the present invention is to provide a dash mounting device from which various accessories are easily viewable by the driver of the vehicle.

Still another object of the present invention is to provide a dash mounting device of a relatively low profile so as not to obstruct the driver's view of the road.

A further object of the invention is to provide a relatively level surface for the attachment of an optional beverage cup holder.

A further object of the invention is to provide a dash mounting device which may be adapted to fit various types and styles of dashboards.

Still another object of the present invention is to provide a dash mounting device which does not interfere with the operation of a vehicle windshield defroster.

According to one aspect of the present invention, a vehicle dash mounting device is provided to mount at least one accessory to a top surface of a dash of a vehicle. This device has a housing for mounting to the top surface of the vehicle dash. Hook and eye fabric fasteners are one form of attachment means for detachably securing the accessory to an upper surface of the housing.

In an illustrated embodiment, the housing is generally of a wedge shape, such that when the housing is mounted upon a sloping top surface of the dash, the upper housing surface is in a substantially horizontal plane. Hook and eye fabric fastener means may also be used to secure the housing to the top surface of the dash. To further secure and readily reinstall the housing in place within vehicles with a defroster type vent in the dash, vent engaging hook means is included.

These and other objects, features, and advantages of the present invention will become apparent to those skilled in the art from the following description and drawings.

BRIEF DESCRIPTION OF THE DRAWINGS

FIG. 4 is a perspective view of an additional embodiment of a dash mounting device in accordance with the invention.

DETAILED DESCRIPTION OF PREFERRED EMBODIMENTS

Figure 1:
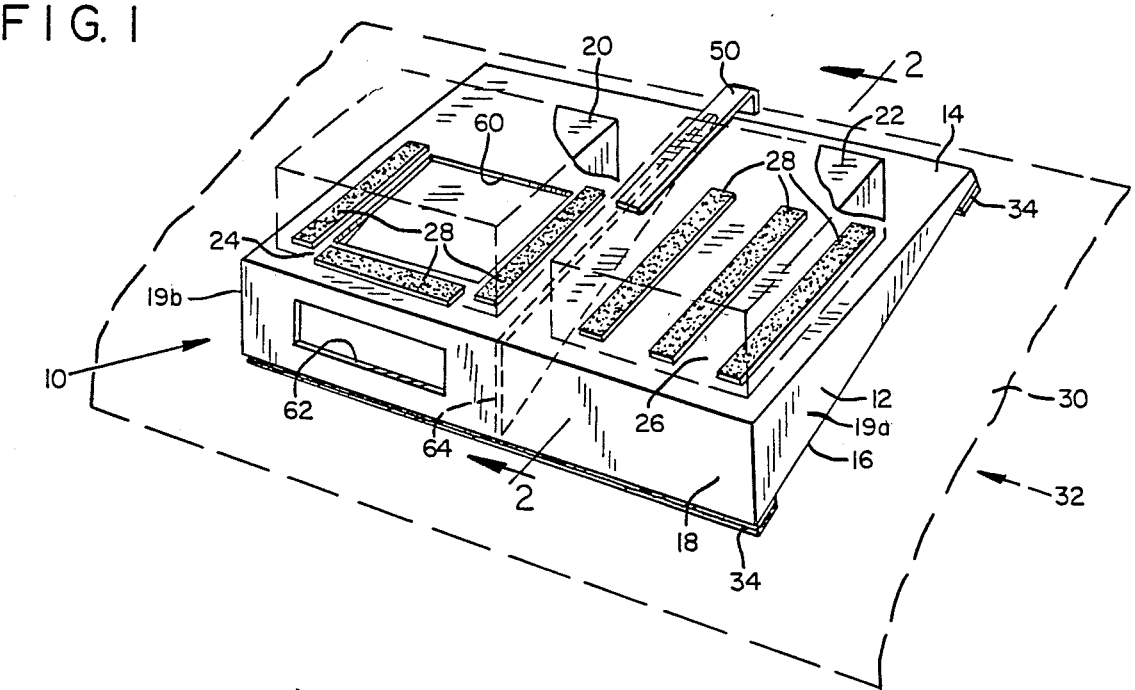
FIG. 1 is a perspective view of a vehicle dash mounting device, shown with two accessories mounted to the upper housing surface in accordance with one embodiment of the invention.

Referring to FIG. 1, a vehicle dash mounting device 10 has a housing 12 which may take on a number of configurations. The illustrated housing has an upper planar rectangular housing surface 14, a planar rectangular base 16, and a front face 18 extending between the upper housing surface 14 and the base 16. Sides 19a, 19b of generally triangular shape complete the housing. A first accessory 20, such as a CB radio, and a second accessory, such as a radar detector 22, are detachably secured to the upper housing surface 14.

The upper surface 14 may generally be divided into a CB radio mounting section 24, beneath the CB radio 20, and a radar detector mounting section 26, located generally beneath the radar detector accessory 22. If only one accessory is to be mounted to the dash, then only one mounting section is provided. The illustrated attachment means for detachably securing the accessories to the upper housing surface 14 are hook and eye or loop fabric fastener means 28, such as sold under the trademark VELCRO.

These fasteners 28 comprise strips of loop or hook fabric secured to the underside of the accessory, as by adhesive and corresponding strips of hook or loop fabric secured to the housing surface 14. Although not as convenient, other detachable connectors may also be used, such as snaps interlock channels, and the like. This permits easy removal and reinstallation of the accessories as desired.

Figure 2:
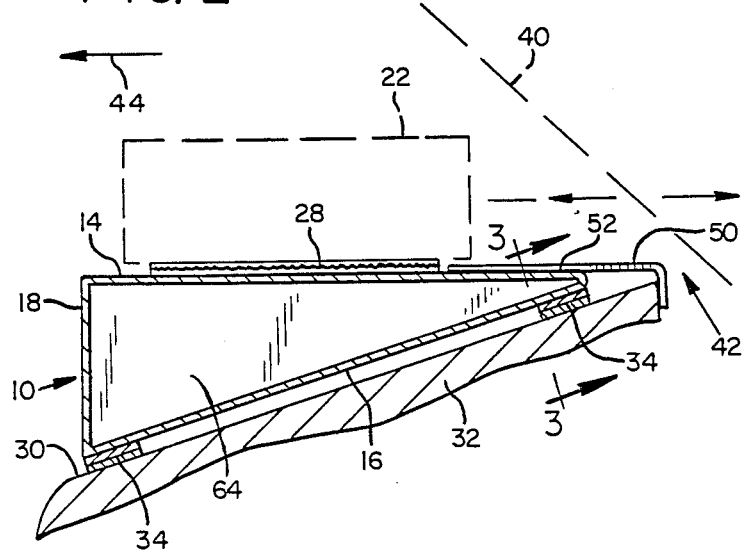
FIG. 2 is a cross-sectional view of the dash mounting device of FIG. 1, taken along line 2—2 thereof.
Figure 3:
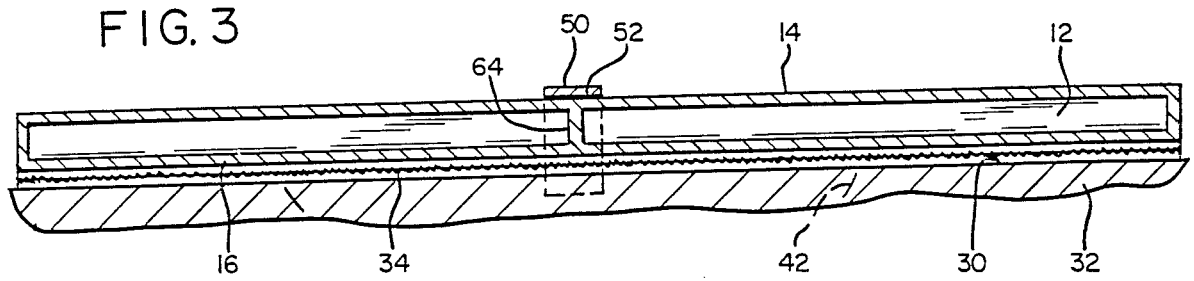
FIG. 3 is a cross-sectional view of the dash mounting device of FIG. 2, taken along line 3—3 thereof.

The housing base 16 is detachably mounted to a top surface 30 of a vehicle dash 32 as by transversely extending hook and eye fabric fastener means 34 (FIGS. 2 and 3). Strips of either hook or eye fabric are secured to the top surface 30 of the dash 32. Corresponding strips of eye or hook fabric are attached to the housing base 16 in position to engage the dash mounted strips.

Other detachable connectors may also be used. The housing, therefore, may be readily removed and reinstalled, with or without the accessories in place. Consequently, the housing may be easily shifted from one vehicle to another as desired. Also, it may be removed to facilitate cleaning of the dash and housing.

As best seen in FIG. 2, the dash mounting device 10 is typically mounted on the dash adjacent a vehicle windshield indicated generally by dashed line 40. The vehicle is shown with a defroster-type vent opening 42 between the windshield 40 and dash 32. The top surface 30 of dash 32 slopes downwardly (moving in a direction indicated by arrow 44) from the windshield 40 toward the vehicle passenger compartment.

From FIG. 2, it can be seen that the illustrated housing 12 is generally of a wedge shape. The base 16 and the upper surface 14 diverge from the windshield 40. This results in housing 12 having a tapering almost triangular cross section. This divergence is at an angle which positions the upper housing surface 14 in a substantially horizontal plane when the base is mounted substantially flush with the downwardly sloping dash. Moreover, the angle may be varied for different styles of vehicle dashboards. With this construction, the device 10 is of a relatively low profile, so as not to obstruct the driver's view of the road. Yet, radar detectors and CB units are supported at a location where they are readily visible and where they are easy to reach during use.

To assist in securing the dash mounting device 10 to the dash 32, an optional vent engaging mechanism, such as a hook means of hook 50, is provided for use with vehicles having a defroster-type vent 42 (FIG. 2). Preferably, the hook 50 is flush mounted to the upper housing surface 14 and engages the vent 42, as shown in FIG. 2 and FIG. 3. The relatively small obstruction of the vent 42 by hook 50 does not interfere with the operation of the vehicle windshield defroster. The use of an auxiliary fastener, such as hook 50, relieves the tension on fasteners by arising from the weight of the device 10 and accessories 20, 22 acting on the downwardly sloping surface of the dash.

In the illustrated embodiment, the hook 50 and housing 12 are provided as separate pieces. During installation, the hook 50 is placed in the vent opening 42 and the housing 12 is placed at the desired location on the dash. The hook 50 is then adhesively or otherwise secured to surface 14 by adhesive 52. It may also be secured using screws or the like for subsequent removal and repositioning when the housing is transferred to a different vehicle. This allows the owner to custom fit the device to any particular vehicle model.

Thus, the vent engaging hook 50 not only provides for additional mounting strength, but the hook also acts as a quick alignment mechanism as device 10 is repeatedly attached to the dash 32.

To prevent theft when the vehicle is left unattended, the accessories 20, 22 may be individually removed from the device 10 by detaching them at fastener means 28. Alternatively, the entire device may be removed with or without the accessories secured in place. This removal of device 10 is accomplished by detaching the dash mounting device 10 from the dash 32 at fastener means 34. Of course in either case, any electrical connections (not shown) between the accessories and the electrical system of the vehicle would be disconnected.

Some accessories, and some CB radios in particular, have speakers mounted to the bottom of the accessory. To allow the sound to be heard within the passenger compartment of the vehicle, at least one aperture 60 is typically provided in the CB radio mounting section 24 of the upper housing surface 14. Additionally, at least one aperture 62 is also provided in the front face 18 of housing 12, as shown in FIG. 1. In the FIG. 4 embodiment, the front face 18 is illustrated with plural apertures 62.

To provide further support for the upper housing surface 14 for the weight of the various accessories, an internal vertical reinforcing or support rib 64 (FIG. 1) extends between the upper surface 14 and the base 16.

In the alternative embodiment shown in FIG. 4, the substantially horizontal upper housing surface 14 is extended in length to provide three sections. These sections include the CB radio mounting section 24, the radar detector mounting section 26, and a cup mounting section for supporting a cup holding accessory 70. These cup holding accessories are prior art and conventional. Alternatively, hook and eye fabric fastener means may be used for detachably securing the cup holding accessory 70 to the relatively level upper surface 14 of the dash mounting device 10. A cup 72 is detachably held in place by the cup holding accessory.

Having illustrated and described the principles of our invention with respect to several preferred embodiments, it should be apparent to those skilled in the art that our invention may be modified in arrangement and detail without departing from such principles. For example, the vehicle dash mounting device 10 could mount other accessories, such as an AM/FM radio or a tape deck. Also, drawers leading to the interior of housing 12 may also be provided. We claim all such modifications falling within the spirit and scope of the following claims.

We claim:

1. A vehicle dash mounting device for mounting at least one accessory to a downwardly sloping top surface of a dash of a vehicle, comprising:
   a one-piece housing adapted to be entirely mounted to the top surface of the vehicle dash, said housing having an upper housing surface and a base opposite the upper housing surface at a fixed location relative to the upper housing surface, the base and upper housing surface diverging at an angle which positions the upper housing surface in a substantially horizontal plane when the base is mounted to the top surface of the dash;
   said housing further including hook and eye fabric fastener means for detachably mounting the housing to the dash; and
   attachment means for detachably securing the accessory to the upper housing surface, the attachment means comprising hook and eye fabric fastener means.

2. A vehicle dash mounting device for mounting at least one accessory to a top surface of a dash of a vehicle for vehicles with a defroster-type vent in the dash, comprising:
   a housing for mounting to the top surface of the vehicle dash with an upper housing surface;
   attachment means for detachably securing the accessory to the upper housing surface, the attachment means comprising hook and eye fabric fastener means; and
   vent engaging hook means for mounting the housing to the dash.

3. A vehicle dash mounting device according to claim 1 for vehicles with a downwardly sloping top surface of the dash, wherein the housing is of a wedge shape, so that the upper housing surface is in a substantially horizontal plane when the housing is mounted to the downwardly sloping top surface of the dash.

4. A vehicle dash mounting device according to claim 1 wherein the accessory is a CB radio.

5. A vehicle dash mounting device for mounting at least one accessory to a top surface of a dash of a vehicle, comprising:
   the accessory of a CB radio;
   a housing for mounting to the top surface of the vehicle dash with an upper housing surface, a base opposite the upper housing surface, and a front face extending between the base and upper housing surface, the upper housing surface having at least one aperture positioned beneath the CB radio accessory, and the front face having at least aperture; and
   attachment means for detachably securing the accessory to the upper housing surface, the attachment means comprising hook and eye fabric fastener means.

6. A vehicle dash mounting device according to claim 5 for vehicles with a defroster-type vent in the dash which includes vent engaging hook means for mounting the housing to the dash, and hook and eye fabric fastener means for detachably mounting the housing to the dash.

7. A vehicle dash mounting device according to claim 6 for vehicles with a windshield wherein the top surface of the dash slopes downwardly from the windshield, the housing having a base opposite the upper housing surface, the base and upper housing surface diverging from the windshield of the dash at an angle which positions the upper housing surface in a substantially horizontal plane when the base is mounted to the top surface of the dash.

8. A vehicle dash mounting device according to claim 7 wherein the upper surface comprises a CB radio section for detachably receiving the CB radio accessory, and a radar detector section for detachably receiving a radar detector accessory.

9. A vehicle dash mounting device for mounting at least one accessory to a downwardly sloping top surface of a dash of a vehicle for vehicles with a defroster-type vent in the dash, comprising:
   a housing with an upper surface, the housing having a wedge shape so that the upper surface is in a substantially horizontal plane when the housing is mounted to the downwardly sloping top surface of the dash;
   means for detachably mounting the housing to the dash;
   attachment means for detachably securing the accessory to the upper surface; and
   vent engaging hook means for mounting the housing to the dash.

10. A vehicle dash mounting device for detachably mounting a CB radio and a radar detector accessories to a top surface of a downwardly sloping dash within a passenger compartment of a vehicle comprising:
    a housing having a base, an upper surface opposite the base, a front face extending between the base and upper surface which faces the passenger compartment of the vehicle, and a tapering cross section between the upper surface and the base which positions the upper surface in a relatively horizontal plane when the base is mounted substantially flush with the downwardly sloping dash, the upper surface including a radar detector mounting section and a CB radio mounting section; and
    hook and eye fabric fastener means on the radar detector mounting section and on the CB radio mounting section for securing each accessory to the upper surface.

11. A vehicle dash mounting device for detachably mounting a CB radio and a radar detector accessories to a top surface of a downwardly sloping dash within a passenger compartment of a vehicle for vehicles with a defroster-type vent in the dash, comprising:
    a housing having a base, an upper surface opposite the base, a front face extending between the base and upper surface which faces the passenger compartment of the vehicle, and a tapering cross section between the upper surface and the base which positions the upper surface in a relatively horizontal plane when the base is mounted substantially flush with the downwardly sloping dash, the upper surface including a radar detector mounting section and a CB radio mounting section;
    hook and eye fabric fastener means on the radar detector mounting section and on the CB radio mounting section for securing each accessory to the upper surface; and
    vent engaging hook means for mounting the housing to the dash.

12. A vehicle dash mounting device according to claim 14 further including hook and eye fabric fastener means for detachably mounting the housing to the dash.

13. A vehicle dash mounting device according to claim 12 further comprising an internal rib, extending between the upper surface and the base.

14. A vehicle dash mounting device according to claim 13, wherein the upper surface has at least one aperture in the CB radio mounting section, and the front face has plural apertures.

15. A vehicle dash mounting device according to claim 14 wherein the upper surface further includes a cup mounting section and means for detachably attaching a cup to the cup mounting section.

* * * * *